United States Patent [19]
Wang et al.

[11] Patent Number: 6,120,692
[45] Date of Patent: Sep. 19, 2000

[54] USE OF METAL DITHIOLENE COMPLEXES IN SELECTIVE OLEFIN RECOVERY (LAW760)

[75] Inventors: Kun Wang, Washington; Edward Ira Stiefel, Bridgewater, both of N.J.

[73] Assignee: Exxon Research and Engineering Company, Florham Park, N.J.

[21] Appl. No.: 09/290,625

[22] Filed: Apr. 13, 1999

[51] Int. Cl.$^7$ ..................................................... C02F 1/68
[52] U.S. Cl. .................. 210/749; 210/767; 210/774; 210/806; 210/909; 210/192
[58] Field of Search ..................................... 210/702, 710, 210/749, 767, 768, 774, 806, 908, 909, 192

[56] References Cited

U.S. PATENT DOCUMENTS

| | | | |
|---|---|---|---|
| 3,052,691 | 9/1962 | Krespan | 260/327 |
| 3,361,777 | 1/1968 | King | 260/429 |
| 5,028,467 | 7/1991 | Mauyama et al. | 428/64 |
| 5,107,058 | 4/1992 | Chen et al. | 585/818 |
| 5,391,791 | 2/1995 | Dubois et al. | 556/60 |
| 5,414,194 | 5/1995 | Dubois et al. | 585/855 |
| 5,430,225 | 7/1995 | Dubois et al. | 585/855 |

FOREIGN PATENT DOCUMENTS

| | | | |
|---|---|---|---|
| WO 98/16490 | 4/1998 | WIPO | C07C 7/152 |

OTHER PUBLICATIONS

DuBois, J.A.C.S. 105, p. 5329 (1983).
Krespan et al., "Dithietene and Bicyclooctatriene Ring Systems From Bis–(Fluoroalkyl)–Acetylenes", J.A.C.S. 82, pp. 1515–1516 (1960).
Krespan, "Bis–(polyfluoroalkyl)–acetylenes . . .", J.A.C.S., vol. 83, pp. 3434–3437 (1961).
Wing et al, "The Oxidative Cycloaddition of Metal Dithiolenes to Olefins . . .", J.A.C.S., 92 (7), pp. 1935–1939 (1970).
Herman et al, The Structure of the Nickel Bis (1,2–Ethenedithiolate)/2,3–Dimethylbutadiene Cycloaddition Reaction Product), J. of Organometallic Chemistry, 63, pp. 441–450 (1973).
Baker et al, "Mechanism of Oxidative Cycloaddition of Olefins to Metal Dithiolenes", J.A.C.S., 93 (24), pp. 6486–6489 (1971).
Davidson et al, "Metal Complexes Derived From cis–1, 2–Dicyano–1,2–Ethylenedithiolate . . .", Inorganic Syntheses 10, pp. 8–26 (1967).
Schrauzer et al, "Structure, Alkylation, and Macrocyclic Derivatives of Bicyclo[2.2.1]hepta–2,5–diene Adducts of Metal Dithienes", J.A.C.S., 92:11, pp. 3508–3509 (1970).
Shrauzer et al, "Preparation, Reactions, and Structure of Bisdithio–α–diketone . . .", J.A.C.S. 87 (7), pp. 1482–1489 (1965).
Davison et al, "The Preparation and Characterization of Four–Coordinate Complexes Related by Electron–Transfer Reactions", Inorganic Chemistry, vol. 2, No. 6, pp. 1227–1232 (1963).
Baker–Hawkes et al, "Characterization and Electronic Structures of Metal Complexes Containing Benzene–1, 2–dithiolate and Related Ligands", Journal of the American Chemical Society, 88:21, pp. 4870–4875, Nov. 5, 1966.
Cotton, "Progress in Inorganic Chemistry ", vol. 10, (1968), Interscience Publishers, pp. 49–77.
Shibahara et al, "Uptake of ethylene by sulfur–bridged cubane–type . . .", Inorganica Chimica Acta 251 (1996), pp. 207–225.
Murata et al, "Synthesis of Mixed–Metal Sulfide Cubane–Type Clusters . . . ", J. Am. Chem. Soc. 1994, 116, 3389–3398.
McKenna et al, "Synthesis of Inequivalently Bridged Cyclopentadienyl Dimers . . .", J. Am. Chem. Soc. 1983, 105, 5329–5337.

*Primary Examiner*—David A. Simmons
*Assistant Examiner*—Betsey J. Morrison
*Attorney, Agent, or Firm*—Linda M. Scuorzo

[57] ABSTRACT

Enhanced synthesis of transition metal dithiolene complexes is described. [1,2-bis(Trifluoromethyl)ethylene-1,2-dithiolato]nickel selectively and reversibly binds olefins ($C_2$ to $C_6$). Under the same conditions, the complex does not react with $H_2O$, $C_2H_2$, CO, and $H_2$, and only slowly reacts with $H_2S$ at high concentrations. The compositions are useful for selective removal and recovery of olefins from process streams containing contaminants such as CO and $H_2S$.

11 Claims, No Drawings

US 6,120,692

USE OF METAL DITHIOLENE COMPLEXES IN SELECTIVE OLEFIN RECOVERY (LAW760)

FIELD OF THE INVENTION

The present invention relates to the synthesis of transition metal dithiolene complexes and their use in selective olefin recovery from multi-component olefin streams.

BACKGROUND OF THE INVENTION

Separation of olefins is an important process in the chemical and petrochemical industry. Currently, the separation is usually done by cryogenic distillation.

However, this technology is energy and capital intensive considering the large volume of olefins produced every year. As a result, alternative technologies have been actively sought.

There are systems reported that use solutions of metal salts capable of reversibly binding olefins. For example, water-soluble copper and silver salts have been reported to bind olefins reversibly in such systems. However, these metal ions are poisoned by contaminants such as acetylene, carbon monoxide, and hydrogen sulfide, which are commonly present in olefin streams.

Thus, it is highly desirable to develop improved reversible binding reagents for use in processes for separating olefins from complex mixtures containing them.

Some transition metal sulfur compounds have been reported to reversibly bind olefins, For example, Shibahara (Inorg. Chim. Acta, Vol. 251, 207–225 (1996)) and Hidai (J.A.C.S., Vol. 116, 3389–98 (1994)) independently reported that mixed-metal sulfur cubane-type compounds react with olefins reversibly. However, in these compounds, the olefin-binding site is at the metal and therefore is likely sensitive to contaminants such as $C_2H_2$, CO and $H_2S$. In a recent patent application (Amoco, WO 98/16490), similar compounds were disclosed for use in olefin recovery by reversible olefin complexation in an aqueous solution. As expected, the system is adversely affected by CO and $H_2S$ that are present in the hydrocarbon stream.

DuBois et al., discovered that certain dinuclear molybdenum-sulfur complexes are capable of binding olefins reversibly (J.A.C.S., Vol. 105, 5329–37 (1983); U.S. Pat. Nos. 5,391,791; 5,414,194; and 5,430,225). The dinuclear compounds are disclosed to act as complexing agents for olefins wherein the sulfur ligands in the complexes act as the site of olefin binding. However, the complexes also react with $H_2$ and with $C_2H_2$ and therefore are not suitable for crude feed. Furthermore, the olefin binding energy is quite strong and, as a result, olefins do not readily dissociate.

Schrauzer et al., (J.A.C.S., Vol. 87 (7), 1483–9 (1965)) disclosed the reaction of metal dithiolene complexes with certain olefins. However, the reactions were carried out at reflux conditions (i.e., high temperature) and the olefins used, e.g., norbornadiene, are more reactive than simple olefins. More importantly, there was no suggestion that less reactive olefins such as ethylene and propylene would be similarly reactive or that the reaction would be reversible under mild conditions.

Wing et al., (J.A.C.S., Vol. 92, 1935–9 (1970) and J. Organomet. Chem., Vol. 63, 441–450 (1973)) teach that certain conjugated dienes reacted with bis[1,2-bis (trifluoromethyl)ethylene-1,2-dithiolato]nickel to form olefin adducts. However, these olefins are also highly reactive, and, in some cases, light was required to force dissociation of olefins from the adducts formed. There is no suggestion of reversibility under mild conditions or any expectation of reactivity with simple (mono)olefins.

Krespan (U.S. Pat. No. 3,052,691; J.A.C.S., Vol. 82, 1515–16 (1960); and J.A.C.S., Vol. 83, 3434–37 (1961)) disclosed the synthesis of bis(trifluoromethyl)-1,2-dithiete ($(CF_3)_2C_2S_2$). The dithiete is not stable at room temperature and tends to oligomerize to form dimers and possibly higher oligomers. Although the dithiete monomer and dimer (and possibly higher oligomers) have the same chemical composition, they are different compounds. At higher temperatures, the equilibrium between the dithiete monomer and dimer favors the monomer.

U.S. Pat. No. 3,361,777 teaches the preparation of bis[1,2-bis(tri-fluoromethyl)ethylene-1,2-dithiolato]nickel (Ni[$S_2C_2(CF_3)_2$]$_2$) by treating nickel turnings with bis (trifluoromethyl)-1,2-dithiete. As used therein and as known to one skilled in the art "dithiete" refers to the $(CF_3)_2C_2S_2$ monomer only, not a mixture of the dithiete monomer with dimer and higher oligomers.

None of the references regarding transition metal dithiolene complexes teaches or suggests a process in which reversible binding of simple olefins (e.g., $C_2$ to $C_6$ olefins) occurs. What is desired is a process by which olefins may be reversibly bound to a compound or complexing agent that is tolerant to contaminants and poisons typically present in olefin-containing streams.

Additionally, it would be desirable to have a process for recovering olefins, particularly low molecular weight olefins from streams containing these olefins, as well as other hydrocarbons and contaminants in which the complexing agent reversibly binds the olefin to be recovered. Moreover, it would be desirable to have a method for synthesizing the nickel dithiolene complex that obviates the need to use pure dithiete and hazardous nickel carbonyl. Applicants' invention addresses these needs.

SUMMARY OF THE INVENTION

The present invention relates in one embodiment to a method for synthesizing transition metal dithiolene complexes and in another embodiment to a method for separating and recovering olefins, particularly $C_2$-$C_6$ olefins, from a stream containing the olefin and at least one other hydrocarbon comprising reversibly complexing the olefin with a transition metal dithiolene complex.

The present invention may comprise, consist or consist essentially of the elements or steps disclosed herein and includes the products produced by the process disclosed herein.

DETAILED DESCRIPTION OF THE INVENTION

One embodiment of the present invention provides for a method for chemically separating and recovering olefins from streams containing olefins and other inorganic and hydrocarbonaceous components or contaminants. Desirably, the olefins to be separated are low molecular weight, simple olefins, e.g., $C_2$-$C_6$, preferably $C_2$-$C_3$ olefins and, the process is selective for such olefins. The process is carried out by contacting a stream containing the olefins to be separated with an extracting or complexing agent that is a Group VIII metal bis(dithiolene) complex; and then reversing the binding to release the olefin. Reversal may be accomplished by appropriate change in pressure or temperature.

Unexpectedly, Applicants have discovered a process for complexing simple olefins with transition metal dithiolene complexes that is selective and reversible; this is not known in the art.

Dithiolene is a commonly used name for 1,2-enedithiolate or benzene-1,2-dithiolate and related dithiolates. For simplicity, the term dithiolene is used when possible throughout the text.

The transition metal dithiolene complexes are selected from complexes represented by the formulas (I) $M[S_2C_2(R^aR^b)]_2$ and (II) $M[S_2C_6(R^1R^2R^3R^4)]_2$. Complexes of the formula (I) and (II) may be obtained by reacting a suitable source of metal, e.g., Group VIII metal, with a suitable source of ligand, which may be obtained from commercial sources or prepared as described according to methods known in the art. The source of metal can be obtained commercially. Typical examples of how to make the dithiolene complexes of the formula (I) can be found in the literature (e.g., Schrauzer et al., J.A.C.S., Vol. 87 (7), 1483–9 (1965)). Anions of complexes of the formula (II) can be made by reacting a metal salt with arene-1,2-dithiols and their analogs (Gray et al., J.A.C.S., Vol. 88 (21), 4870–5 (1966)). The neutral form of the formula (II) is accessible by oxidation, either chemically or electrochemically. Additionally complexes of the formula (I) may be produced by the process of: (a) contacting a compound of the formula, $R^a$—C≡C—$R^b$ with sulfur $S_8$, at conditions of temperature and pressure sufficient to result in the formation of a dithiete, $(R^aR^b)C_2S_2$, and reacting the dithiete with zero-valent metal, e.g., $Ni(CO)_4$.

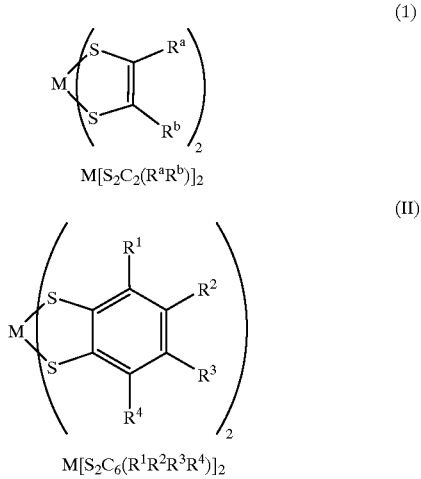

$M[S_2C_2(R^aR^b)]_2$ (1)

$M[S_2C_6(R^1R^2R^3R^4)]_2$ (II)

The structural formula for the transition metal bis (dithiolene) complexes are shown above in Formula (I) for $M[S_2C_2(R^aR^b)]_2$ and in Formula (II) for $M[S_2C_6(R^1R^2R^3R^4)]_2$.

In the formula (I), M is a transition metal, preferably a Group VIII metal, $R^a$ and $R^b$ may be the same or different, and are independently selected from hydrogen, electron-withdrawing groups including those that are or contain heterocyclic, cyano, carboxylate, carboxylic ester, keto, nitro, and sulfonyl groups, and hydrocarbyl groups, including alkyl, cyclo alkyl, alkenyl and aryl groups, unsubstituted or fully or partly substituted, preferably those substituted with electron-withdrawing groups. Preferably the groups are cyano groups or halo substituted alkyl groups, more preferably the halo substituents on the carbon atoms are fluoro groups. Most preferably $R^a$ and $R^b$ are $CF_3$ or CN.

As known in the art, another type of dithiolene complex that may also be used contains (substituted) benzene dithiolato ligands, represented by the structure in the formula (II) above. In the formula (II), M also is a transition metal, preferably a Group VIII metal, $R^1$, $R^2$, $R^3$, and $R^4$ are independently selected and may be the same or different, and $R^1$ to $R^4$ are hydrogen, electron-withdrawing groups as described above, and unsubstituted or fully or partly substituted hydrocarbyl groups including alkyl, cycloalkyl, alkenyl, and aryl groups, preferably with substituents at the carbon atoms of the hydrocarbyl group that are electron-withdrawing groups. Preferably, the group is a halo group.

Those skilled in the art would recognize more complex forms in the dithiolene class that also may be used (e.g., Mueller-Westerhoff, U. T., "Dithiolene and Related Species", Comprehensive Coordination Chemistry, Vol. 2, 595–631 (1987); McCleverty, J. A., "Metal 1,2-Dithiolene and Related Complexes", Prog. Inorg. Chem., Vol. 10, 49–221 (1968)).

The transition metals are preferably Fe, Co, Ni, Cu, Pd and Pt, more preferably Ni. Thus the complex can be any metal bis(1,2-enedithiolate), preferably a group VIII metal bis(1,2-enedithiolate), more preferably substituted 1,2-enedithiolate with electron withdrawing groups, and most preferably the bis[1,2-bis(trifluoromethyl)ethylene-1,2-dithiolato] metal complex.

Applicants have disclosed that complexes of the formula (I) may be produced by the process of (a) contacting a compound of the formula $R^a$—C≡C—$R^b$ with sulfur $S_8$ at condidtions of sufficient of temperature and pressure sufficient to result in the formation of a dithiete $(R^aR^b)$ $C_2S_2$ or a mixture of products corresponding to the formula $(R^aR^bC_2S_2)_n$; wherein n is at least 1, and wherein the mixture at least contains products corresponding to the formula, and wherein n is 2. That is, the mixture contains products of the formula wherein n =2 and at least one product of the formula wherein n=1 or n>2; (b) contacting the products of step (a) with a finely ground, Group VIII metal powder (preferably sub-micron size) at conditions effective to form the corresponding metal dithiolene complexes of the formula $M[S_2C_2(R^aR^b)]_2$.

The preparative reaction is carried out under conditions that bring the starting materials into contact at temperatures at which the dithiete mixture (i.e., mixture of monomer dimer and higher oligomers) is liquid, e.g., 20–200° C. Ambient (atmospheric) pressure is suitable but other pressures may be used to facilitate the reaction. Toluene or other non-reactive hydrocarbon solvents may be used. The ratio of metal to 1,2-substituted dithiete starting material should be at least 1:2. In the preparation, a slight excess of metal is desirable to enhance the yield.

Advantageously, Applicants' method of preparation of transition metal dithiolene complexes of the formula in (I) above obviates the need to use a pure dithete monomer, i.e., $(R^aR^bC_2S_2)_n$ wherein n=1 as the ligand source. Isolation of pure monomer is possible but the monomer tends to oligomerize, i.e., to produce dimers, trimers and higher oligomers (n>1 in the above formula). Additionally, Applicants' method also allows the use of metals instead of zero-valent compounds such as metal carbonyls. Thus, Applicants' process allows for the direct synthesis of transition metal dithiolene complexes from a mixture of dithiete monomers, dimers and higher oligomers thereof without the need to isolate and use the monomer alone as a starting material.

Unexpectedly, Applicants have discovered that the transition metal dithiolene complexes described herein have the capacity to reversibly bind olefins, particularly simple olefins, especially $C_2$–$C_6$ olefins, preferably $C_2$–$C_3$ olefins. Thus, an embodiment of the present invention is a method for separating and recovering simple olefins from streams containing at least the olefins to be separated.

Typically, but not necessarily, such olefin-containing streams contain hydrocarbons. However, they also may contain additional organic or inorganic components. The process is carried out by contacting an olefin-containing hydrocarbon stream with a transition metal dithiolene complex of the formula $M[S_2C_2(R^aR^b)]_2$ (wherein M, $R^a$ and $R^b$ are as specified above) or of the formula $M[S_2C_6(R^1R^2R^3R^4)]_2$, wherein M, $R^1$, $R^2$, $R^3$, and $R^4$ are as specified above, in solution. The streams may be liquid, gaseous, or mixed. The solvent can be a hydrocarbon, a halogenated hydrocarbon, a polar organic liquid, an ionic liquid, or an aqueous solution provided that it is essentially non-interfering with the reaction of the olefin and metal dithiolene complex. Olefin separation is accomplished by contacting the stream containing the olefin to be separated with the metal dithiolene under conditions of temperature and pressure sufficient to bind the olefin to the metal dithiolene complex to form an adduct of the olefin to be separated and the metal dithiolene complex; olefin recovery is accomplished by changing the temperature or pressure to dissociate the to adduct and release the olefin from the adduct. As stated previously, in Applicants' process the olefin-containing stream may contain any number of other components or contaminants of the primarily hydrocarbonaceous stream in addition to the simple olefins, e.g., alkanes, aromatics, $H_2$, CO, $H_2S$, $H_2O$, and alkynes such as acetylene.

The process of the present invention is selective and reversible with respect to the olefins notwithstanding the presence of such other contaminants, especially at the level usually found in typical refinery or chemical streams (typically less than about 10 wt %). In the process, contacting may be carried out in the presence of suitable non-reactive cosolvent(s) and complexing of the metal dithiolene with the olefin in the olefin-containing stream and/or subsequent release of such olefin may be facilitated using such (co)solvents. Additionally or separately, other process conditions may be selected or manipulated to facilitate the reversibility of the olefin binding to the metal dithiolene complex, and the subsequent release of the olefin and recovery of the metal dithiolene. Thus, for example, a change in temperature, pressure, or solvent characteristics may be employed to achieve reversibility of olefin binding.

One skilled in the art may select suitable techniques and conditions for implementation of those methods to effect and alter the complexation of olefins to metal dithiolene complexes, included among them changes in temperature (e.g., increase to release olefin), pressure (e.g., decrease to release olefin), and solvent changes or effects (e.g., see Example 7) either alone or in combination. Non-reactive solvents and co-solvents are preferred, as ultimately, the olefin must be dissociated from the complex if the metal dithiolene complex is to be recovered, and be recycled or reused.

Advantageously, the process of the present invention may be used to enhance the recovery (yield) of simple olefins from dirty feeds such as multi-component olefin streams containing hydrocarbonaceous and non-hydrocarbonaceous contaminants.

EXAMPLES

Example 1

Preparation of bis[ 1 ,2-bis(trifluoromethyl)ethylene-1,2-dithiolato]nickel.

A mixture of bis(trifluoromethyl)-1,2-dithiete and its oligomers (0.45 g, 2 mmol in $(CF_3)_2C_2S_2$) was mixed with nickel powder (sub-micron size, 0.07 g, 1.1 mmol) in 20 mL of anhydrous toluene. The mixture was refluxed under argon for two days. The deep-blue solution was filtered through a fine frit to remove unreacted nickel. The solvent was then removed in vacuo and a black solid was obtained (yield 0.4 g, 80%), which was identified as $Ni[S_2C_2(CF_3)_2]_2$ by NMR, IR, and mass spectrometry.

Example 2

Reaction of ethylene with bis[1,2-bis(trifluoromethyl)ethylene-1,2-dithiolato]nickel.

The reaction was studied by UV-vis and NMR spectroscopy. About 1 mM solution of bis[1,2-bis(trifluoromethyl)ethylene-1,2-dithiolato] nickel in toluene was placed in a cuvette. Ethylene was bubbled through the solution for 60 seconds and the cuvette was sealed. Decrease in the absorbance at 746 nm was monitored by UV-vis spectroscopy. The color of the solution changed from violet-purple to greenish-yellow during the course of a few hours, and UV-vis spectra indicated that an equilibrium had been reached. At this point, the ethylene atmosphere in the cuvette was displaced by passing argon through the solution. In a few hours, the color of the solution changed back to violet-purple; and the absorbance at 746 mn increased to the original value of the uncomplexed $Ni[S_2C_2(CF_3)_2]_2$ as revealed by UV-vis spectroscopy. The solution is again saturated with ethylene and the above process is repeated. The cycle was repeated three times without any visible or spectroscopic changes of the end points of the reaction, suggesting a reversible reaction of the nickel dithiolene complex with ethylene.

Example 3

Example 2 was repeated using propylene. A reversible reaction was observed similarly.

Example 4

Example 2 was repeated using cis-2-butene and a reversible reaction was also observed. Reaction rate and equilibrium constant were not measured in this case.

Example 5

Reaction of 1-hexene and bis[ 1,2-bis(trifluoromethyl)ethylene-1,2-dithiolato]nickel.

The reaction was carried out differently since in this case the olefin substrate is a liquid. A solution of the nickel dithiolene complex in toluene (1 mM) was treated with at least 20 equiv. of 1-hexene. Decrease in the absorbance at 746 nm was observed. The mixture was then pumped dry and redissolved in toluene. The UV-vis features were found to recover in the course of a few hours indicating a reversible reaction with 1-hexene.

A separate sample was prepared by dissolving the nickel dithiolene complex (10 mg) in neat 1-hexene (1 mL). The solution was analyzed by field desorption mass spectroscopy. A 1:1 (nickel dithiolene complex)/1-hexene adduct was observed (m/z=594) as the only olefin-containing species.

Example 6

Example 5 was repeated using trans-3-hexene. Similarly, a reversible reaction was observed.

Example 7

Kinetic and equilibrium studies were carried out by monitoring UV-vis spectra. In all cases, the absorbance at 746 nm and 570 nm decreases with time while the absorbance at 420 nm increases at the same time, resulting in an isosbestic point at 442 nm. A clean reaction between the nickel dithiolene complex and the olefin is indicated. Typical concentration of $Ni[S_2C_2(CF_3)_2]_2$ is ca. 1 mM, while a large excess of olefin (ethylene, propylene, 1-hexene, and trans-3-hexene, individually) is used in toluene or 1,2-dichloroethane at 30° C. The formation of the olefin adduct is second-order, being first-order in the nickel complex and first-order in the olefin. Equilibrium constants were estimated by UV-vis spectroscopy at the end of each reaction. Mass spectra suggest that the adducts have a 1:1 stoichiometry of olefin/(nickel dithiolene complex). Rates and equilibrium constants for different olefin substrates are listed in Table 1. Rates in two different solvents are compared. Significant accelerations are observed for those in the polar solvent.

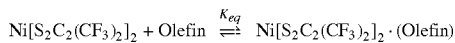

$$Ni[S_2C_2(CF_3)_2]_2 + \text{Olefin} \xrightleftharpoons{K_{eq}} Ni[S_2C_2(CF_3)_2]_2 \cdot (\text{Olefin})$$

TABLE 1

Rates and Equilibrium Constants of Reactions Between Olefins and $Ni[S_2C_2(CF_3)_2]_2$ at 30° C.

|  | $K_{eq}$ (M$^{-1}$) Toluene | k × 10$^4$ (M$^{-1}$s$^{-1}$) Toluene | k × 10$^4$ (M$^{-1}$s$^{-1}$) 1,2-Dichloroethane |
| --- | --- | --- | --- |
| Ethylene | 140 | 9 | 51 |
| Propylene | 70 | 25 | 153 |
| 1-Hexene | 60 | 11 | 77 |
| trans-3-Hexene | 15 | 2 |  |

Example 8

Effects of possible contaminants on the nickel dithiolene complex. The nickel dithiolene complex produced in Example 1 was treated individually with possible contaminants. A toluene solution of $Ni[S_2C_2(CF_3)_2]_2$ (1 mM) saturated with $H_2$ under 1 atmosphere of $H_2$ was placed at 30° C. for 18 hours. No reaction was observed as monitored by UV-vis spectroscopy. Similar tests were also carried out with CO and $C_2H_2$; and no reaction was observed in either case as monitored by UV-vis spectroscopy.

Example 9

Effects of water on the nickel dithiolene complex. 1 mM solution of $Ni[S_2C_2(CF_3)_2]_2$ in water-saturated toluene was placed under 1 atmosphere of nitrogen in a cuvette. After 18 hours at 30° C., no reaction was found by UV-vis and NMR spectroscopy.

Example 10

Example 8 was repeated using pure $H_2S$ atmosphere. The absorbance at 748 nm was found to decrease by ca. 30% after 18 hours at 30° C. The estimated rate of reaction with $H_2S$ is an order of magnitude slower than that with pure ethylene. In a separate experiment, a mixture of $H_2S/C_2H_4$ containing 8 mol % $H_2S$ was used, and there is no difference in the reaction rate for the formation of the (nickel dithiolene)-olefin adduct from that of pure ethylene. The reaction with ethylene is still reversible. While the nickel dithiolene complex does react slowly with pure $H_2S$, the observations reveal that low concentration of $H_2S$ does not act as a poison to the reaction between the nickel dithiolene complex and ethylene. The actual concentration of $H_2S$ in a typical olefin stream is likely to be far lower than the lowest concentration (8 mol %) used in these studies.

What is claimed is:

1. A method for separating mono olefins from olefin-containing streams, comprising:—contacting a mono olefin-containing stream with a metal dithiolene compound selected from compounds represented by the formulas $M[S_2C_2(R^aR^b)]2$ and $M[S_2C_6(R^1R^2R^3R^4)]_2$ at conditions sufficient to form an adduct of the olefin with the metal dithiolene compound, wherein M is a transition metal, $R^a$ and $R^b$ and $R^1$, $R^2$, $R^3$, and $R^4$ are independently selected and may be the same or different and are selected from hydrogen, electron withdrawing groups and unsubstituted and electron withdrawing group substituted hydrocarbyl groups; and—dissociating the olefin from the adduct to recover the olefin.

2. The process of claim 1 wherein the olefin-containing stream contains at least one of paraffins, $H_2$, CO, $C_2H_2$, $H_2S$, $H_2O$, $CO_2$, and alkynes.

3. The process of claim 1 wherein contacting is carried out at a temperature of from about −60° C. to 150° C.

4. The process of claim 1 further comprising the step of recovering the adduct from the feed stream.

5. The process of claim 1 wherein dissociating is carried out by addition of a suitable solvent.

6. The process of claim 1 wherein dissociating is carried out by an effective change in at least one of temperature or pressure.

7. A method for separating olefins from olefin-containing streams. comprising: contacting an olefin-containing stream with a metal dithiolene compound selected from compounds represented by the formulas $M[S_2C_2(R^aR^b)]_2$ and $M[S_2C_6(R^1R^2R^3R^4)]_2$ at conditions sufficient to form an adduct of the olefin with the metal dithiolene compound, wherein M is a transition metal, $R^a$ and $R^b$ and $R^1$, $R^2$, $R^3$, and $R^4$ are independently selected and may be the same or different and are selected from hydrogen, electron withdrawing groups and unsubstituted and electron withdrawing group substituted hydrocarbyl groups; and wherein the metal dithiolene compound represented by the formula $M[S_2C_2(R^aR^b)]_2$-is produced by the process of:

(a) contacting $R^a$—C≡C—$R^b$ with sulfur at conditions sufficient to form a mixture of compounds represented by the formula $[(R^aR^b)C_2S_2]_n$ wherein the mixture contains compound corresponding to n=2 in combination with the compounds to n=1 and n>2;

(b) contacting the $[(R^aR^b)C_2S_2]_n$ prepared in (a) with metal powder at conditions sufficient to form $M[S_2C_2(R^aR^b)]2$ wherein $R^a$ and $R^b$ are independently selected and may be the same or different and are selected from hydrogen, electron withdrawing groups and substituted and unsubstituted hydrocarbyl groups.

8. The process of claim 1 or 7 wherein the electron withdrawing groups are selected from halo-, heterocyclo-, cyano-, carboxylate, carboxylic ester, keto-, nitro and sulfonyl groups.

9. The process of claim 1 or 7 wherein $R^a$, $R^b$, $R^1$, $R^2$, $R^3$, and $R^4$ are independently selected from $CF_3$ and CN.

10. The process of claim 1 or 7 wherein M is selected from Ni, Pd and Pt.

11. A method for making a metal dithiolene compound represented by the formula $M[S_2C_2(R^aR^b)]_2$, comprising:

(a) contacting $R^a\text{---}C\equiv C\text{---}R^b$ with sulfur at conditions sufficient to form a mixture of compounds represented by the formula $[(R^aR^b)C_2S_2]_n$ wherein the mixture contains compound corresponding to n=2 in combination with the compounds corresponding to n=1 and n>2;

(b) contacting the $[(R^aR^b)C_2S_2]_n$ prepared as in (a) with metal powder at conditions sufficient to form $M[S_2C_2(R^aR^b)]_2$ wherein $R^a$ and $R^b$ are independently selected and may be the same or different and are selected from hydrogen, electron withdrawing groups and substituted and unsubstituted hydrocarbyl groups.

* * * * *